United States Patent [19]
Wakamiya

[11] Patent Number: 4,676,607
[45] Date of Patent: Jun. 30, 1987

[54] BEHIND STOP LENS

[75] Inventor: Koichi Wakamiya, Tokyo, Japan

[73] Assignee: Nippon Kogaku K. K., Tokyo, Japan

[21] Appl. No.: 701,763

[22] Filed: Feb. 14, 1985

[30] Foreign Application Priority Data

Feb. 22, 1984 [JP] Japan .................................. 59-31904

[51] Int. Cl.⁴ .............................................. G02B 9/20
[52] U.S. Cl. ...................................... 350/476; 350/450
[58] Field of Search ......................... 350/476, 432, 450

[56] References Cited

U.S. PATENT DOCUMENTS 4,192,579  3/1980  Hyakumura ........................ 350/476
4,606,615  8/1986  Wakamiya .......................... 350/476

FOREIGN PATENT DOCUMENTS 0075611  6/1981  Japan .................................... 350/476

Primary Examiner—John K. Corbin
Assistant Examiner—Rebecca D. Gass
Attorney, Agent, or Firm—Shapiro and Shapiro

[57] ABSTRACT

A behind stop lens comprises, in succession from the object side, a first lens which is a positive meniscus lens having its convex surface facing the object side, a second lens which is a biconcave lens, a third lens which is a biconvex lens, and a fourth lens which is a negative meniscus lens having its convex surface facing the image side. The third lens and the fourth lens are joined together to form a positive cemented lens. The behind stop lens has a stop at a position most adjacent to the image side.

7 Claims, 6 Drawing Figures

BEHIND STOP LENS

BACKGROUND OF THE INVENTION

1. Field of the Invention

This invention relates to a compact behind stop modified TESSAR ® lens having an angle of view of 60° or more and brightness of the order of F2.8 and comprising three groups of four lenses.

2. Description of the Prior Art

The TESSAR ® lens has a feature that the full length of the lens is relatively short and the aberration fluctuation by the object distance is relatively small, and is known as a compact optical system. Particularly, the behind stop TESSAR ® lens enables the distance adjustment to be accomplished with the stop being fixed and by moving only the lens forwardly and therefore, it is best suited for the mechanism of a compact auto focus camera and has often been put into practical use.

In the usual TESSAR ® lens, a third component has a cemented surface convex relative to the object side, but numerous modified TESSAR ® lenses having a cemented surface concave relative to the object side are known. In such modified TESSAR ® lenses, the sagittal image plane is somewhat flat and the full length of the lens can be made somewhat shorter while maintaining the balance of various aberrations. Now, in the case of a behind stop lens, of the oblique light beam, the light rays passing through the marginal portion of a first lens pass through a portion near the center of the stop and therefore, a decrease in marginal light is liable to be conspicuous, and this leads to a disadvantage that the deficiency of the quantity of marginal light is difficult to correct even if stopped down. In the TESSAR ® lens, it is possible to increase the effective diameter of a first lens and considerably reduce the decrease in marginal light, but occurrence of coma and chromatic coma is conspicuous, and particularly in a modified TESSAR ® lens having a cemented surface concave relative to the object side, occurrence of chromatic coma has been substantial.

SUMMARY OF THE INVENTION

It is an object of the present invention to provide a behind stop lens of the modified TESSAR ® which comprises three groups of four lenses and keeps a compact configuration and yet in which various aberrations, especially, coma and astigmatism are corrected better than in the prior art and chromatic coma is also well corrected.

DESCRIPTION OF THE PREFERRED EMBODIMENTS

Figure 1:
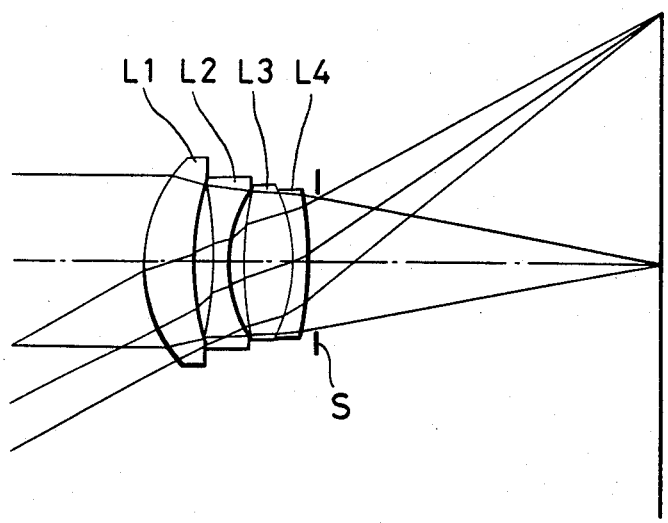
FIG. 1 shows the optical path of a behind stop lens according to the present invention.
Figure 2:
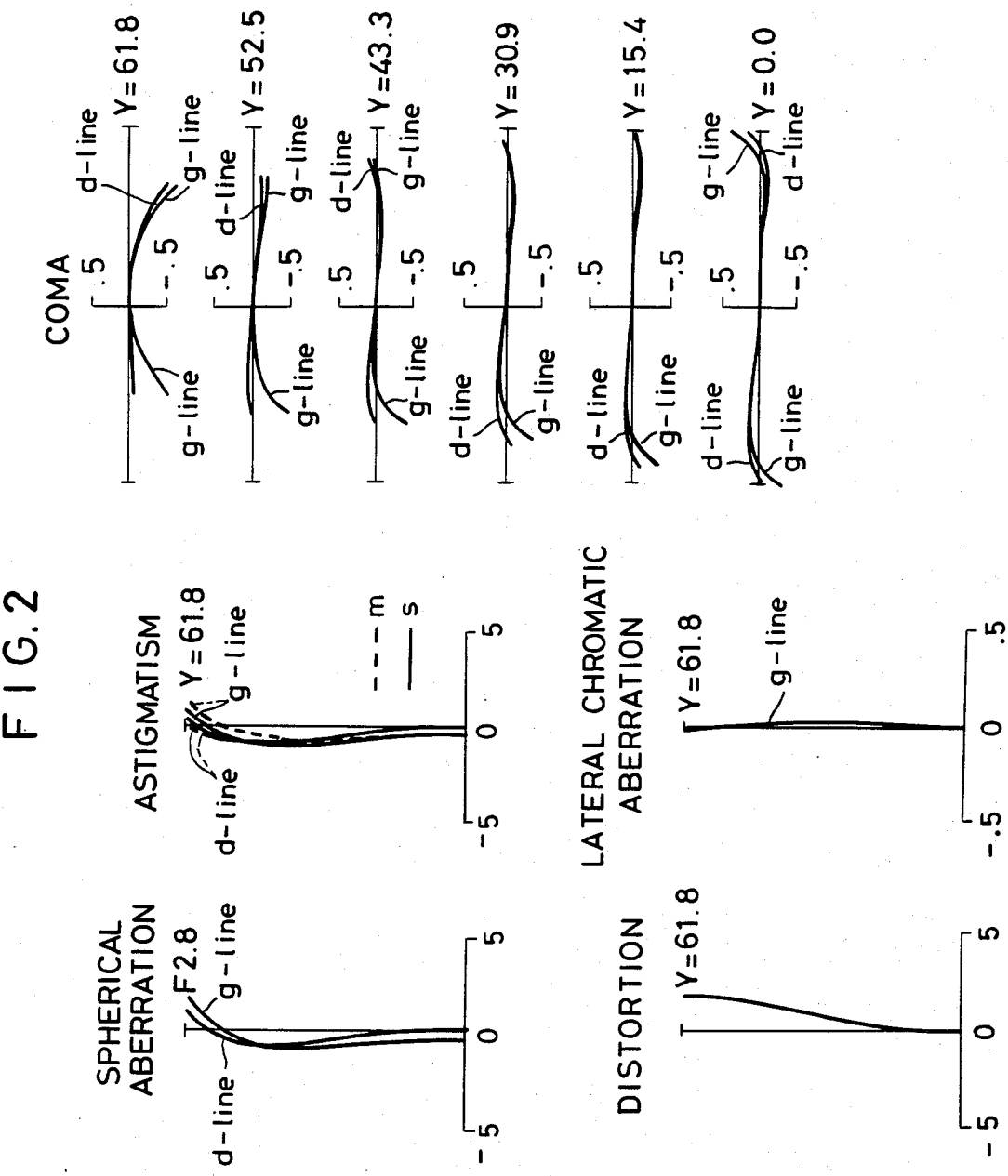
FIGS. 2 to 6 show the various aberrations in first to fifth embodiments, respectively, of the present invention.
Figure 3:
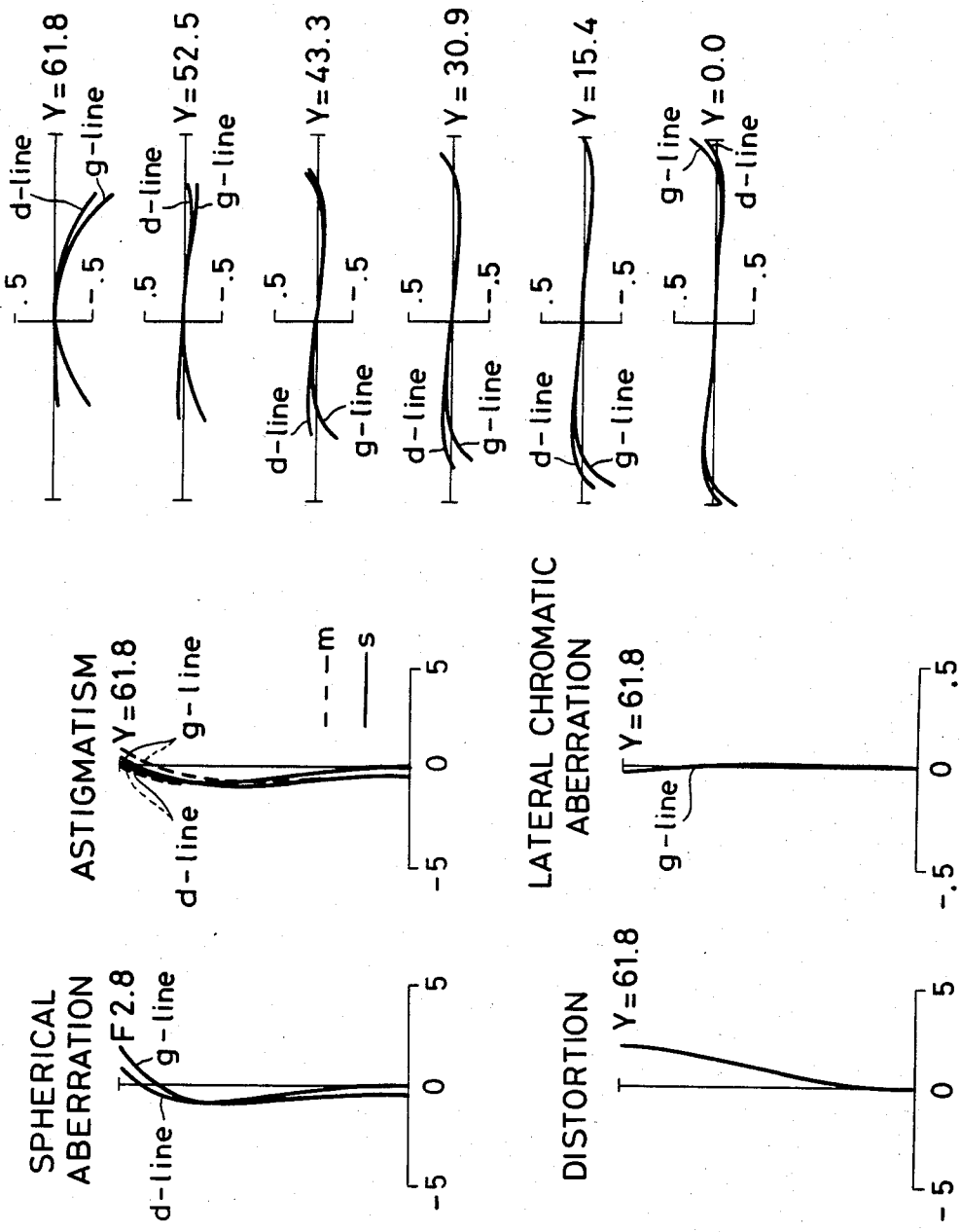
Figure 4:
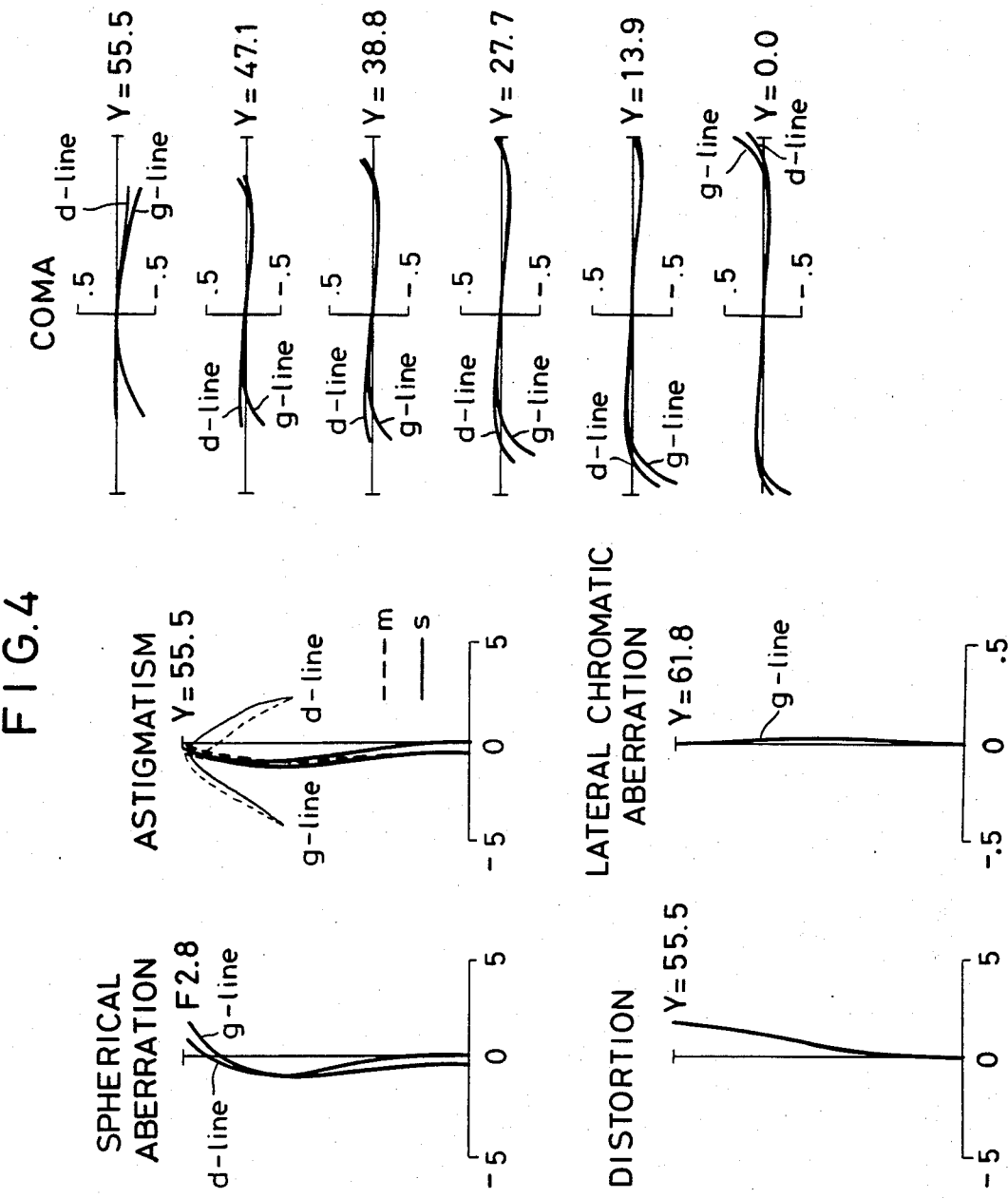
Figure 5:
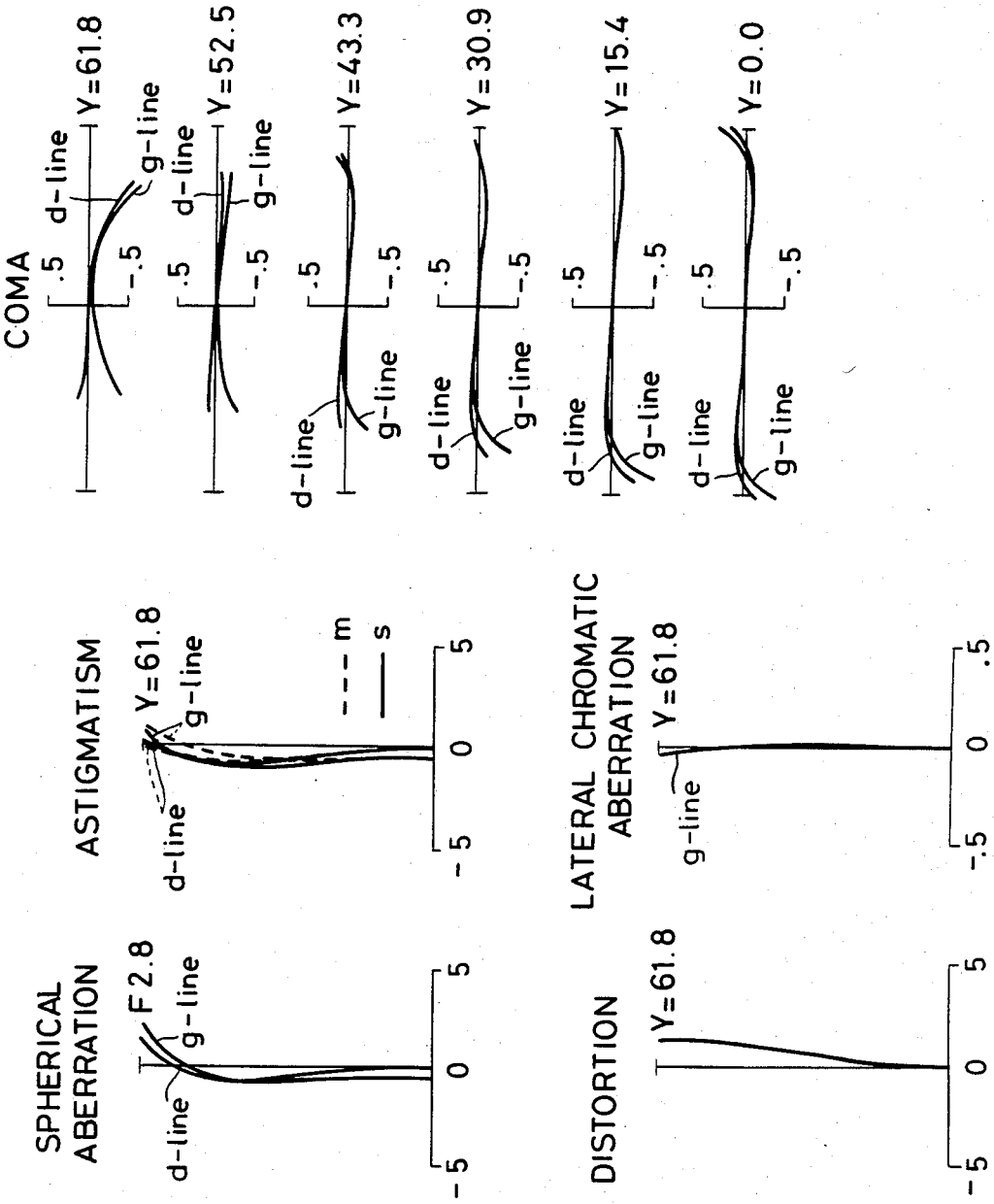
Figure 6:
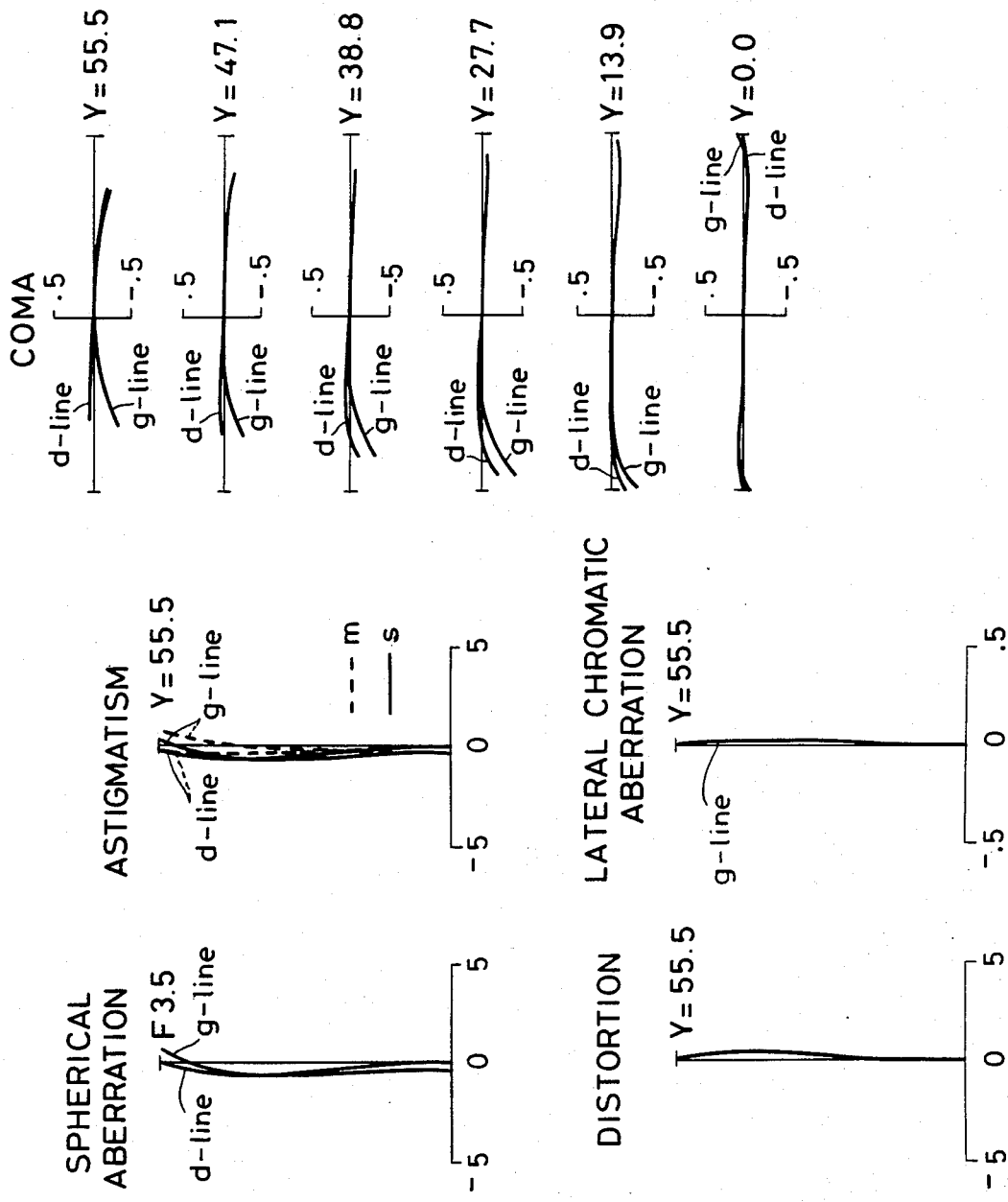

The present invention is a behind stop lens which, as shown in the optical path view of FIG. 1, comprises, in succession from the object side, a first lens L1 which is a positive meniscus lens having its convex surface facing the object side, a second lens L2 which is a biconcave lens, a third lens L3 which is a biconvex lens, and a fourth lens L4 which is a negative meniscus lens having its convex surface facing the image side, the third lens L3 and the fourth lens L4 being joined together to form a positive cemented lens, and which has a stop S at a position most adjacent to the image side and which satisfies the following conditions:

$$0.3f < \Sigma d < 0.36f \quad (1)$$

$$1.58 < n2 < 1.745 \quad (2)$$

$$n1 > n2 \quad (3)$$

$$0.26 < n3 - n4 < 0.33 \quad (4)$$

$$0.6f < f1 < 1.0f \quad (5)$$

$$0.37f < -r6 < 0.40f \quad (6)$$

$$1.7f < -r7 < 10f \quad (7)$$

$$10 < \nu4 - \nu3 < 25 \quad (8)$$

$$2 < (d5 + d6)/d3 < 9.9 \quad (9)$$

where
- $\Sigma d$: full length of the lens system, i.e., the distance from the foremost lens surface to the last lens surface
- f: composite focal length of the lens
- r6: curvature radius of the object side surface of the fourth lens
- r7: curvature radius of the image side surface of the fourth lens
- d5: center thickness of the third lens
- d6: center thickness of the fourth lens
- n1: refractive index of the first lens
- n2: refractive index of the second lens
- n3: refractive index of the third lens
- n4: refractive index of the fourth lens
- $\nu3$: Abbe number of the third lens
- $\nu4$: Abbe number of the fourth lens
- f1: focal length of the first lens.

Each of the foregoing conditions will hereinafter be described in detail.

Condition (1) is a condition for well correcting coma and the quantity of marginal light. If the full length is substantially beyond the upper limit of this condition, to secure a predetermined quantity of marginal light, it will be necessary that an oblique light ray be incident from a height more distant from the optic axis and thus, the light beam will necessarily pass through the edges of the first lens L1 and the second lens L2 and high-order aberrations will occur and particularly, coma will be aggravated. If the lower limit of this condition is exceeded, the aggravation of coma will be in a direction for decrease, but the lens thickness and the air thickness will become smaller and therefore, the effective diameter of each lens will become smaller and the oblique light ray will be intercepted by the first lens and the second lens and the quantity of marginal light will be deficient.

Conditions (2), (3) and (4) are conditions for well correcting the Petzval sum. A popular photo-taking lens has a positive Petzval sum because its entire system has a positive power, and to correct this, it is effective to make the convex lens have a high refractive index and make the concave lens have a low refractive index. Condition (3), i.e., n2 < n1, is a condition necessary to correct the Petzval sum. If, in condition (2), the refractive index n2 of the second lens which is a negative lens exceeds the upper limit thereof, the refractive index thereof will be too high relative to the convex lens and therefore, the correction of the Petzval sum will not be accomplished. If n2 exceeds the lower limit, it will be effective for the correction of the Petzval sum, but the radius of curvature of the second lens will become smaller to keep the focal length thereof and therefore, divergent high-order aberrations will occur in the marginal portion of the lens and coma will be aggravated and good correction will not be accomplished.

If the lower limit of condition (4) is exceeded, the Petzval sum will again be under-corrected. As the difference in refractive index (n3−n4) between the third lens which is a positive lens and the fourth lens which is a negative lens is greater, it is more advantageous for the correction of the Petzval sum, but if the upper limit of condition (4) is exceeded, the converging action in the cemented surface will become too strong and as a result, spherical aberration will increase and cannot be corrected.

Condition (5) is a condition effective for the correction of distortion. In the behind stop lens, usually positive distortion is liable to occur. Particularly, the focal length of a positive lens which is at the greatest distance from the stop becomes short and if the refractive power thereof is increased, positive distortion will increase. If the lower limit of condition (5) is exceeded, positive distortion will become strong and cannot be well corrected. As the value of the focal length f1 of the first lens is greater, the correction of distortion is easier, but in order to render the focal length of the entire system into a predetermined value, the focal length of the positive lens comprising the third lens and the fourth lens cemented together becomes shorter. If the upper limit of condition (5) is exceeded, the converging action of the positive lens comprising the third lens and the fourth lens cemented together will become too strong and particularly, as the angle of view becomes greater, the coma in the portion above the principal ray is more sharply aggravated and thus, the correction thereof becomes difficult.

Conditions (6) and (7) are conditions for well correcting coma with condition (5). First, condition (6) prescribes the direction and curvature of the cemented surface between the third and fourth lenses, and this surface has its sharply concave surface facing the object side and particularly strongly has the function of converging the lower light beam relative to the principal ray of the oblique light beam. The coma in the portion lower than the principal ray can be well balanced by well balancing the strong converging property of this surface and the strong diverging property in the second lens. If the upper limit of condition (6) is exceeded, the converging action of the cemented surface will be weakened and the diverging property in the second lens will be relatively strongly affected and coma, especially, lower coma will be aggravated and cannot be corrected. Also, the second lens is a flint lens having high dispersion and therefore causes light of short wavelength (g-line) to diverge intensely and chromatic coma is aggravated and cannot be corrected. If the lower limit of condition (6) is exceeded, the converging property of the cemented surface will become relatively strong and lower coma will occur in the opposite direction and cannot be well corrected.

Next, condition (7) prescribes the range of the radius of curvature of the last surface of the lens, and this last surface is a surface for converging the light rays. This converging action more effectively converges the light beam lower than the principal ray of the oblique light beam, but this last surface does not cause high-order aberrations so much as the cemented surface between the third and fourth lenses. Therefore, it has the effect of converging the lower light beam in the entire picture plane. Accordingly, by well balancing the converging action of the last surface which affects the entire picture plane, the converging action of the cemented surface between the third and fourth lenses which works particularly remarkably at a great angle of view and the diverging action of the second lens, it becomes possible to well correct the coma lower than the principal ray of the oblique light beam over the entire area of the picture plane. If the upper limit of condition (7) is exceeded and the converging action weakens, the lower coma at a small angle of view will become negative and aggravated and good correction thereof will not be accomplished. If the lower limit of condition (7) is exceeded and the converging action strengthens, the lower coma at a small angle of view will become positive and aggravated and good correction thereof will not be accomplished.

Condition (8) is a condition for better correcting chromatic coma. Since the second lens is formed of flint glass, a light ray of short wavelength (g-line) excessively diverges in the second lens in a Tessar type lens and chromatic coma occurs therein. To correct this more effectively, utilization may preferably be made of the converging action in the positive lens comprising the third and fourth lenses cemented together and the light ray of short wavelength (g-line) may be more strongly converged by the surfaces of these lenses. Condition (8) is a condition effective for this purpose and, as the difference in Abbe number ($\nu 4 - \nu 3$) between the third lens and the fourth lens is greater, the influence of high-order aberrations strengthens and better correction is accomplished. However, if the upper limit of this condition is exceeded, the dispersion of the third lens will become relatively great and therefore, the on-axis chromatic aberration will be under-corrected and cannot be well corrected. On the other hand, if the lower limit of this condition is exceeded, the effect of correction of chromatic coma will become smaller and good correction of chromatic coma will become difficult.

Condition (9) is concerned with the center thickness of the positive lens comprising the third and fourth lenses cemented together. Generally, in a positive lens, spherical aberration and curvature aberration of meridional image plane have negative values. In the rearward cemented positive lens component in a popular TESSAR ® lens, the cemented surface has a converging action and therefore, spherical aberration and curvature aberration of meridional image plane are caused to occur more negatively. These aberrations are corrected by a single negative lens, but where the aberration by the negative lens is great, the influence of high-order aberrations resulting from correction becomes strong and the bending of spherical aberration and the bending of curvature aberration of meridional image plane become substantial. It is generally known that it is effective to make the center thickness of the positive lens great in order to reduce the occurrence of negative spherical aberration and negative curvature aberration of meridional image plane by the positive lens, and in the present invention, the composite center thickness ($d5+d6$) of the third and fourth lenses forming the positive lens is prescribed relative to the center thickness d3 of the negative lens as shown in condition (9), whereby the swelling of spherical aberration and the bending of curvature aberration of meridional image plane are corrected. As condition (9) is of a greater value, it is possible to suppress the swelling of spherical aberration and the bending of curvature aberration of meridional image plane to smaller values, but as the thickness of the cemented positive lens comprising the third and fourth lenses becomes relatively greater, the oblique light ray tends to become more spaced apart from the optic axis at the position of the stop and at last, an insufficient quantity of marginal light results. If the upper limit of condition (9) is exceeded, the quantity of marginal light will become deficient, and if the lower limit of condition (9) is exceeded, the swelling of spherical aberration and the bending of curvature aberration of meridional image plane will become greater and good correction of aberrations cannot be accomplished.

In the present invention, the quantity of marginal light of the lens is sufficiently secured and moreover, the first lens and the second lens contact each other in the marginal portions thereof and the second lens and the third lens contact each other in the marginal portions thereof, whereby the lens can be constructed without using a spacer, and as the condition for this, it is desirable that d2>d4. Also, as the condition for keeping the upper coma better, it is desirable that 0.52f<r-5<0.63f, and as the condition for keeping astigmatism better, it is desirable that 0.50f<r2<0.75f.

Embodiments of the present invention will now be described in detail.

First to fourth embodiments are examples in which F-number is 2.8, and a fifth embodiment is an example in which F-number is 3.5. The fifth embodiment is one in which positive distortion which is liable to occur in the behind stop modified TESSAR ® lens according to the present invention is corrected smaller. As the condition for correcting distortion smaller as in the fifth embodiment, it is desirable that 1.6<f1/f3<2.1, where f1 is the focal length of the first lens and f3 is the composite focal length of the third lens L3 and the fourth lens L4. If the upper limit of this condition is exceeded, distortion will become negative, and if the lower limit of this condition is exceeded, distortion will become positive.

The numerical data of each embodiment will be shown below. In the tables below, the left-hand numbers represent the order from the object side, Bf represents the back focal length, f1 represents the focal length of the first lens, f2 represents the focal length of the second lens, and f3 represents the composite focal length of the third lens and the fourth lens.

(First Embodiment)
f = 100   F 2.8   2ω = 62.6°

| No. | Radius of curvature r | Center thickness and spacing d | Refractive index n | Abbe number ν | |
|---|---|---|---|---|---|
| 1 | 32.469 | 10.568 | 1.77279 | 49.4 | L1 |
| 2 | 71.207 | 3.542 | | | |
| 3 | −160.959 | 3.999 | 1.71736 | 29.5 | L2 |
| 4 | 30.706 | 2.571 | | | |
| 5 | 60.931 | 10.568 | 1.79668 | 45.5 | L3 |
| 6 | −38.016 | 2.571 | 1.51680 | 64.1 | L4 |
| 7 | −347.523 | | | | |
| Bf = 76.712 | | Σd = 33.819 | | | |
| | | f1 = 69.0 | | | |
| | | f2 = −35.6 | | | |
| | | f3 = 47.2 | | | |

(Second Embodiment)
f = 100   F 2.8   2ω = 62.4°

| No. | Radius of curvature r | Center thickness and spacing d | Refractive index n | Abbe number ν | |
|---|---|---|---|---|---|
| 1 | 32.481 | 10.858 | 1.77261 | 49.4 | L1 |
| 2 | 72.782 | 2.857 | | | |
| 3 | −176.257 | 4.857 | 1.71728 | 29.5 | L2 |
| 4 | 30.292 | 2.572 | | | |
| 5 | 60.131 | 10.572 | 1.79654 | 45.5 | L3 |
| 6 | −38.204 | 2.572 | 1.51709 | 64.2 | L4 |
| 7 | −494.155 | | | | |
| Bf = 76.183 | Σd = 34.288 | | | | |
| | f1 = 67.9   f2 = −35.7   f3 = 47.8 | | | | |

(Third Embodiment)
f = 100   F 2.8   2ω = 57.2°

| No. | Radius of curvature r | Center thickness and spacing d | Refractive index n | Abbe number ν | |
|---|---|---|---|---|---|
| 1 | 32.468 | 10.567 | 1.77279 | 49.4 | L1 |
| 2 | 71.206 | 3.541 | | | |
| 3 | −160.956 | 3.999 | 1.71736 | 29.5 | L2 |
| 4 | 30.705 | 2.570 | | | |
| 5 | 60.929 | 10.568 | 1.79668 | 45.5 | L3 |
| 6 | −38.015 | 2.570 | 1.51680 | 64.1 | L4 |
| 7 | −347.516 | | | | |
| Bf = 76.713 | Σd = 33.815 | | | | |
| | f1 = 69.0   f2 = −35.6   f3 = 47.2 | | | | |

(Fourth Embodiment)
f = 100   f 2.8   2ω = 62.8°

| No. | Radius of curvature r | Center thickness and spacing d | Refractive index n | Abbe number ν | |
|---|---|---|---|---|---|
| 1 | 32.943 | 10.286 | 1.77279 | 49.4 | L1 |
| 2 | 71.697 | 3.429 | | | |
| 3 | −159.028 | 4.857 | 1.71736 | 29.5 | L2 |
| 4 | 31.252 | 2.571 | | | |
| 5 | 60.757 | 10.571 | 1.79668 | 45.5 | L3 |
| 6 | −38.424 | 2.571 | 1.51680 | 64.1 | L4 |
| 7 | −313.984 | | | | |
| Bf = 77.285 | Σd = 34.285 | | | | |
| | f1 = 70.7   f2 = −36.0   f3 = 47.0 | | | | |

(Fifth Embodiment)
f = 100   f 3.5   2ω = 58°

| No. | Radius of curvature r | Center thickness and spacing d | Refractive index n | Abbe number ν | |
|---|---|---|---|---|---|
| 1 | 31.222 | 10.000 | 1.76684 | 46.8 | L1 |
| 2 | 55.310 | 3.333 | | | |
| 3 | −122.575 | 3.590 | 1.69895 | 30.1 | L2 |
| 4 | 30.515 | 2.051 | | | |
| 5 | 53.162 | 10.770 | 1.78797 | 47.5 | L3 |
| 6 | −37.168 | 2.821 | 1.51680 | 64.1 | L4 |
| 7 | −180.745 | | | | |
| Bf = 79.834 | Σd = 32.565 | | | | |

-continued

| | (Fifth Embodiment) f = 100  f 3.5  2ω = 58° | | | |
|---|---|---|---|---|
| No. | Radius of curvature r | Center thickness and spacing d | Refractive index n | Abbe number ν |
| | | f1 = 79.2  f2 = −34.6  f3 = 41.7 | | |

The aberrations in the above-described various embodiments are shown in FIGS. 2, 3, 4, 5 and 6, respectively. In each of the aberration graphs, spherical aberration, astigmatism, distortion and coma for d-line (λ=587.6 nm) as the reference light ray and lateral chromatic aberration of g-line (λ=435.8 nm) for d-line are shown, and the amounts of aberration of g-line (λ=435.8 nm) are also shown with spherical aberration astigmatism and coma.

From each of the aberration graphs, it is apparent that any of the various embodiments maintains an excellent imaging performance.

As shown in the above-described embodiments, according to the present invention, there is provided a behind stop modified TESSAR ® which is a compact lens having an angle of view of 60° or more and brightness of F2.8 and yet in which various aberrations are well corrected and especially, coma and astigmatism are corrected better than in the prior art and at the same time, chromatic coma is also well corrected.

I claim:

1. A behind stop lens having a compact configuration in which various aberrations, especially coma and chromatic coma, are well corrected, comprising, in succession from the object side, a first lens which is a positive meniscus lens having its convex surface facing the object side, a second lens which is a biconcave lens, a third lens which is a biconvex lens, and a fourth lens which is a negative meniscus lens having its convex surface facing the image side, said third lens and said fourth lens being joined together to form a positive cemented lens, said behind stop lens having a stop at a position most adjacent to the image side and satisfying the following conditions:

$0.30f < \Sigma d < 0.36f$ (1)

$1.58 < n2 < 1.745$ (2)

$n1 > n2$ (3)

$0.26 < n3 - n4 < 0.33$ (4)

$0.6f < f1 < 1.0f$ (5)

$0.37f < -r6 < 0.40f$ (6)

$1.7f < -r7 < 10f$ (7)

$10 < \nu4 - \nu3 < 25$ (8)

$2 < (d5 + d6)/d3 < 9.9$ (9)

where
Σd: full length of the lens system
f: composite focal length of the lens
r6: curvature radius of the object side surface of the fourth lens
r7: curvature radius of the image side surface of the fourth lens
d5: center thickness of the third lens
d6: center thickness of the fourth lens
n1: refractive index of the first lens
n2: refractive index of the second lens
n3: refractive index of the third lens
n4: refractive index of the fourth lens
ν3: Abbe number of the third lens
ν4: Abbe number of the fourth lens
f1: focal length of said first lens.

2. A behind stop lens according to claim 1, wherein numerical data are as follows:

| | f = 100  f 2.8  2ω = 62.6° | | | | |
|---|---|---|---|---|---|
| No. | Radius of curvature r | Center thickness and spacing d | Refractive index n | Abbe number ν | |
| 1 | 32.469 | 10.568 | 1.77279 | 49.4 | L1 |
| 2 | 71.207 | 3.542 | | | |
| 3 | −160.959 | 3.999 | 1.71736 | 29.5 | L2 |
| 4 | 30.706 | 2.571 | | | |
| 5 | 60.931 | 10.568 | 1.79668 | 45.5 | L3 |
| 6 | −38.016 | 2.571 | 1.51680 | 64.1 | L4 |
| 7 | −347.523 | | | | |
| | Bf = 76.712 | | Σd = 33.819 | | |
| | | | f1 = 69.0 | | |
| | | | f2 = −35.6 | | |
| | | | f3 = 47.2 | | | where the left-hand numbers represent the order from the object side, Bf represents the back focal length, f1 represents the focal length of said first lens, f2 represents the focal length of said second lens, and f3 represents the composite focal length of said third lens and said fourth lens.

3. A behind stop lens according to claim 1, wherein numerical data are as follows:

| | f = 100  F 2.8  2ω = 62.4° | | | | |
|---|---|---|---|---|---|
| No. | Radius of curvature r | Center thickness and spacing d | Refractive index n | Abbe number ν | |
| 1 | 32.481 | 10.858 | 1.77261 | 49.4 | L1 |
| 2 | 72.782 | 2.857 | | | |
| 3 | −176.257 | 4.857 | 1.71728 | 29.5 | L2 |
| 4 | 30.292 | 2.572 | | | |
| 5 | 60.131 | 10.572 | 1.79654 | 45.5 | L3 |
| 6 | −38.204 | 2.572 | 1.51709 | 64.2 | L4 |
| 7 | −494.155 | | | | |
| | Bf = 76.183 | | Σd = 34.288 | | |
| | | | f1 = 67.9 | | |
| | | | f2 = −35.7 | | |
| | | | f3 = 47.8 | | | where the left-hand numbers represent the order from the object side, Bf represents the back focal length, f1 represents the focal length of said first lens, f2 represents the focal length of said second lens, and f3 represents the composite focal length of said third lens and said fourth lens.

4. A behind stop lens according to claim 1, wherein numerical data are as follows:

| | f = 100  F 2.8  2ω = 57.2° | | | | |
|---|---|---|---|---|---|
| No. | Radius of curvature r | Center thickness and spacing d | Refractive index n | Abbe number ν | |
| 1 | 32.468 | 10.567 | 1.77279 | 49.4 | L1 |
| 2 | 71.206 | 3.541 | | | |
| 3 | −160.956 | 3.999 | 1.71736 | 29.5 | L2 |
| 4 | 30.705 | 2.570 | | | |
| 5 | 60.929 | 10.568 | 1.79668 | 45.5 | L3 |
| 6 | −38.015 | 2.570 | 1.51680 | 64.1 | L4 |
| 7 | −347.516 | | | | |

-continued

| | f = 100 F 2.8 2ω = 57.2° | | | |
|---|---|---|---|---|
| No. | Radius of curvature r | Center thickness and spacing d | Refractive index n | Abbe number ν |
| | Bf = 76.713 | | Σd = 33.815 | |
| | | | f1 = 69.0 | |
| | | | f2 = −35.6 | |
| | | | f3 = 47.2 | | where the left-hand numbers represent the order from the object side, Bf represents the back focal length, f1 represents the focal length of said first lens, f2 represents the focal length of said second lens, and f3 represents the composite focal lnegth of said third lens and said fourth lens.

5. A behind stop lens according to claim 1, wherein numerical data are as follows:

| | f = 100 f 2.8 2ω = 62.8° | | | | |
|---|---|---|---|---|---|
| No. | Radius of curvature r | Center thickness and spacing d | Refractive index n | Abbe number ν | |
| 1 | 32.943 | 10.286 | 1.77279 | 49.4 | L1 |
| 2 | 71.697 | 3.429 | | | |
| 3 | −159.028 | 4.857 | 1.71736 | 29.5 | L2 |
| 4 | 31.252 | 2.571 | | | |
| 5 | 60.757 | 10.571 | 1.79668 | 45.5 | L3 |
| 6 | −38.424 | 2.571 | 1.51680 | 64.1 | L4 |
| 7 | −313.984 | | | | |
| | Bf = 77.285 | | Σd = 34.285 | | |
| | | | f1 = 70.7 | | |
| | | | f2 = −36.0 | | |
| | | | f3 = 47.0 | | | where the left-hand numbers represent the order from the object side, Bf represents the back focal length, f1 represents the focal length of said first lens, f2 represents the focal length of said second lens, and f3 represents the composite focal length of said third lens and said fourth lens.

6. A behind stop lens according to claim 1, further satisfy the following condition:

$$1.6 < f1/f3 < 2.1$$

where f1 is the focal length of said first lens and f3 is the composite focal length of said third lens and said fourth lens.

7. A behind stop lens according to claim 6, wherein numerical data are as follows:

| | f = 100 f 3.5 2ω = 58° | | | | |
|---|---|---|---|---|---|
| No. | Radius of curvature r | Center thickness and spacing d | Refractive index n | Abbe number ν | |
| 1 | 31.222 | 10.000 | 1.76684 | 46.8 | L1 |
| 2 | 55.310 | 3.333 | | | |
| 3 | −122.575 | 3.590 | 1.69895 | 30.1 | L2 |
| 4 | 30.515 | 2.051 | | | |
| 5 | 53.162 | 10.770 | 1.78797 | 47.5 | L3 |
| 6 | −37.168 | 2.821 | 1.51680 | 64.1 | L4 |
| 7 | −180.745 | | | | |
| | Bf = 79.834 | | Σd = 32.565 | | |
| | | | f1 = 79.2 | | |
| | | | f2 = −34.6 | | |
| | | | f3 = 41.7 | | | where the left-hand numbers represent the order from the object side, Bf represents the back focal length, f1 represents the focal length of said first lens, f2 represents the focal length of said second lens, and f3 represents the composite focal length of said third lens and said fourth lens.

* * * * *